(12) United States Patent
Ohashi

(10) Patent No.: US 8,925,939 B2
(45) Date of Patent: Jan. 6, 2015

(54) STEERING SYSTEM

(71) Applicant: JTEKT Corporation, Osaka-shi, Osaka (JP)

(72) Inventor: Tatsuya Ohashi, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/074,191

(22) Filed: Nov. 7, 2013

(65) Prior Publication Data
US 2014/0137692 A1    May 22, 2014

(30) Foreign Application Priority Data
Nov. 16, 2012    (JP) .................................. 2012-252332

(51) Int. Cl.
*B62D 3/12*    (2006.01)

(52) U.S. Cl.
USPC ..................................... 280/93.514; 403/144

(58) Field of Classification Search
USPC .................. 280/93.514, 93.515, 779, 93.511; 403/136, 138, 144; 74/422
See application file for complete search history.

(56) References Cited

U.S. PATENT DOCUMENTS

| | | | | |
|---|---|---|---|---|
| 3,128,110 | A | * | 4/1964 | Herbenar ....................... 403/138 |
| 3,693,999 | A | * | 9/1972 | Wood, Jr. .................. 280/93.511 |
| 5,704,726 | A | * | 1/1998 | Nemoto ........................ 403/133 |
| 6,422,779 | B1 | * | 7/2002 | Spagnuolo .................... 403/138 |
| 8,147,161 | B2 | * | 4/2012 | Hahn et al. .................... 403/122 |
| 8,348,541 | B2 | * | 1/2013 | Mahlmann et al. ........... 403/122 |

FOREIGN PATENT DOCUMENTS

WO    WO 2005/123184 A1    12/2005

* cited by examiner

*Primary Examiner* — Faye M. Fleming
(74) *Attorney, Agent, or Firm* — Oliff PLC

(57) ABSTRACT

A steering system includes a rack shaft, a rack housing, a rack end, and an impact absorbing member that is provided between a restriction face formed within the rack housing and an end face of the rack end, and that absorbs an impact generated when the restriction face and the end face come into contact with each other. The impact absorbing member includes an elastic portion, and a restriction portion having an elastic modulus higher than that of the elastic portion and having a length in the axial direction, which is shorter than that of the elastic portion. A compression allowance, which is a difference in length in the axial direction between the elastic portion and the restriction portion, is brought to zero when the restriction face and the end face come into contact with each other via the impact absorbing member due to a steering input.

5 Claims, 4 Drawing Sheets

STEERING SYSTEM

INCORPORATION BY REFERENCE/RELATED APPLICATION

This application claims priority to Japanese Patent Application No. 2012-252332 filed on Nov. 16, 2012, the disclosure of which, including the specification, drawings and abstract, is incorporated herein by reference in its entirety.

BACKGROUND OF THE INVENTION

1. Field of the Invention

The invention relates to a steering system.

2. Discussion of Background

In a conventional vehicle steering system, the rotation of a steering shaft caused by steering of a steering wheel is transmitted to a steered mechanism such as a rack-and-pinion mechanism. Thus, the angle of steered wheels is changed. A rack end is provided at each shaft end portion of a rack shaft that constitutes the above-described rack-and-pinion mechanism. The rack end connects a tie rod to the rack shaft such that the tie rod is pivotable relative to the rack shaft. When the steering wheel is steered, a steering input that acts on the rack shaft is transmitted to the steered wheels via the rack ends and the tie rods.

In the steering system that includes the above-described steered mechanism, when the rack end comes into contact with a rack housing that accommodates the rack shaft, the movement of the rack shaft is mechanically restricted. In other words, the contact of the rack end with the rack housing occurs, whereby a movable range of the rack shaft and a movable range of the steered wheels are determined.

In the meantime, if the steered wheel is turned, for example, when the steered wheel runs onto a curbstone, an input (reverse input) due to the turning of the steered wheel acts on the rack end. Furthermore, if the reverse input is greater than the steering input caused by a driver's steering operation, there is a possibility that the rack end may be moved to collide with the rack housing due to the reverse input and a strong impact may act on a steering system.

In recent years, there has been developed a steering system in which an impact absorbing member made of an elastic material is arranged between the rack housing and each rack end to absorb an impact load when a collision occurs (for example, WO 2005/123484 A1).

In the steering system that includes the above-described steered mechanism, even when a driver steers the steering wheel until the steering angle reaches a maximum allowable steering angle, the contact of the rack end with the rack housing occurs. That is, in the above-described steering system, even when the contact of the rack end with the rack housing occurs due to a steering input caused by the driver, the impact absorbing member arranged between the rack end and the rack housing is elastically deformed. Therefore, when the driver steers the steering wheel until the steering angle becomes a steering angle close to the allowable steering angle, the driver feels a sense of discomfort due to elasticity caused by the deformation of the impact absorbing member.

When the steering input is changed under such a situation, the deformation amount of the impact absorbing member changes. Therefore, the distance between the rack end and the rack housing is changed. That is, even a slight change in the steering input causes a change in the angle of the steered wheels. Therefore, for example, when the driver turns a vehicle while maintaining the state where the steering wheel has been fully steered and kept at the allowable steering angle, the steering input needs to be maintained constant. Therefore, the drivability may be deteriorated.

SUMMARY OF THE INVENTION

The invention provides a steering system configured such that an impact load that is caused when contact of a rack end with a rack housing occurs is absorbed while deterioration of the drivability is suppressed.

According to a feature of an example of the invention, there is provided a steering system including: a steered shaft that is able to reciprocate in an axial direction of the steered shaft; a housing that accommodates the steered shaft; a joint that is fitted to a shaft end portion of the steered shaft so as to connect the steered shaft to a steered wheel such that the steered wheel is allowed to be steered; and an impact absorbing member that is provided between a restriction face formed within the housing and an end face of the joint, and that absorbs an impact generated when the restriction face and the end face come into contact with each other, wherein the impact absorbing member includes an elastic portion having elasticity, and a restriction portion having an elastic modulus higher than that of the elastic portion and having a length in the axial direction, which is shorter than that of the elastic portion, and a compression allowance, which is a difference in length in the axial direction between the elastic portion and the restriction portion, is brought to zero when the restriction face and the end face come into contact with each other via the impact absorbing member due to a steering input.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
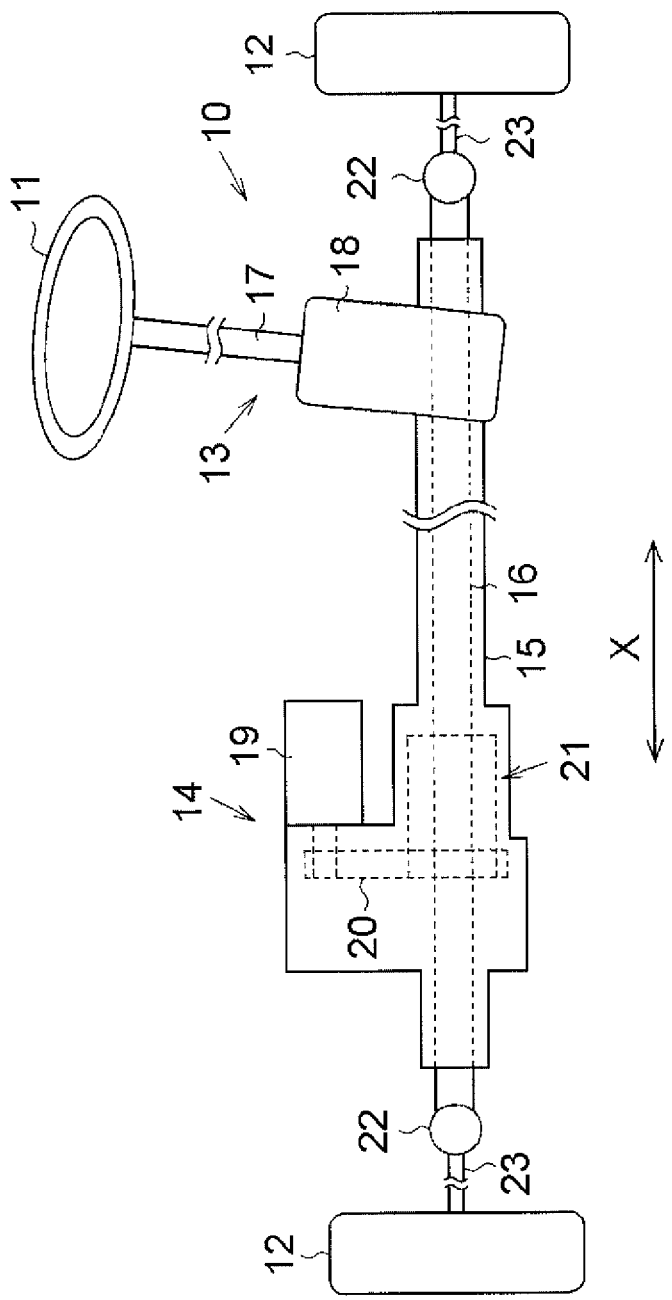
FIG. 1 is a view schematically illustrating a steering system.

An embodiment of the invention, in which a steering system according to the invention is implemented as an electric power steering system, will be described with reference to the accompanying drawings. As illustrated in FIG. 1, an electric power steering system 10 (hereinafter, referred to as "steering system 10" where appropriate) includes a steered mechanism 13 that transmits the rotation of a steering wheel 11 to steered wheels 12, and an assist device 14 that assists the steering of the steering wheel 11. In addition, the steering system 10 includes a rack housing 15, which is an example of a housing and which is extended in the lateral direction of a vehicle, and a rack shaft 16, which is an example of a steered shaft, which is arranged inside the rack housing 15, and which is extended in the lateral direction of the vehicle. Hereinafter, the lateral direction of the vehicle will be referred to as an axial direction X, because the lateral direction of the vehicle coincides with the axial direction of the rack shaft 16.

The steered mechanism 13 includes a steering shaft 17 that is rotated together with the steering wheel 11 and a rack-and-pinion mechanism 18 that converts the rotation of the steering shaft 17 into a linear motion of the rack shaft 16. That is, when a driver steers the steering wheel 11, steering transmission force for moving the rack shaft 16 in the axial direction X is input into the rack shaft 16 via the steered mechanism 13.

The assist device 14 includes a motor 19 arranged outside the rack housing 15, and a ball screw mechanism 21 to which driving force is transmitted from the motor 19 via a belt 20. The assist device 14 is able to output assisting force for moving the rack shaft 16 in the axial direction X in response to the steering of the steering wheel 11 by the driver.

In addition, tie rods 23 are pivotably connected to respective ends of the rack shaft 16 via rack ends 22 provided at shaft end portions of the rack shaft 16. Each rack end 22 is an example of a joint. A distal end of each tie rod 23 is connected to a knuckle (not illustrated).

With this configuration, the rack shaft 16 is linearly moved in the lateral direction of the vehicle (axial direction X) by the steering transmission force that is input into the rack shaft 16 due to the driver's steering of the steering wheel 11 and assisting force output from the assist device 14 in response to the steering operation. The linear motion of the rack shaft 16 is transmitted to the knuckles via the tie rods 23 connected to the respective ends of the rack shaft 16, and thus the steered angle of the steered wheels 12, that is, the vehicle travelling direction, is changed. Accordingly, in the steering system 10 according to the present embodiment, a steering input that moves the rack shaft 16 in the axial direction X is expressed as the sum of the steering transmission force and the assisting force.

Figure 2:
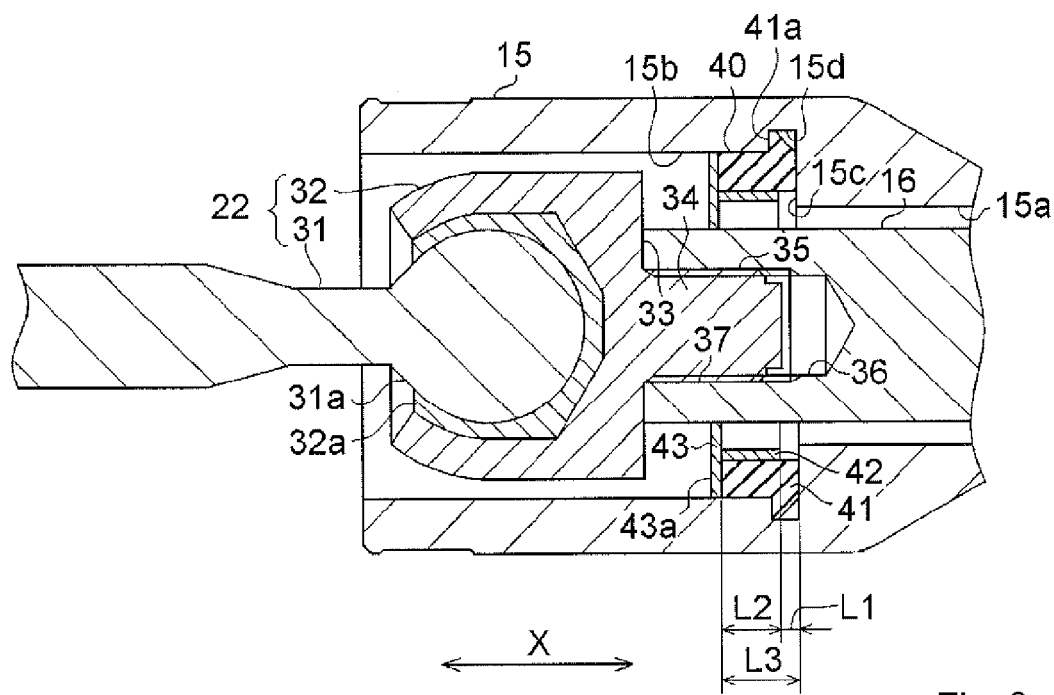
FIG. 2 is a sectional view illustrating the schematic configuration of a rack end and its surroundings in the steering system.

Next, the configuration of each shaft end portion of the rack shaft 16 will be described. As illustrated in FIG. 2, the rack end 22 is formed as a ball joint that includes a ball stud 31 having a ball portion 31a at its distal end, and a bottomed substantially cylindrical socket 32 in which the ball portion 31a is pivotably accommodated. A concave spherical aligning seat 32a made of a resin material is mounted inside the socket 32. The concave shape of the aligning seat 32 corresponds to the convex spherical shape of the ball portion 31a of the ball stud 31. Therefore, the ball portion 31a is fitted into the aligning seat 32a, and thus the ball stud 31 is pivotably connected to the socket 32. One end of the tie rod 23 is fixed to the ball stud 31, and thus the tie rod 23 is pivotably connected to the rack shaft 16.

In addition, the socket 32 is screwed into the shaft end portion of the rack shaft 16, and thus the rack end 22 is fixed to the rack shaft 16. Specifically, a columnar portion 34 that protrudes to the rack shaft 16 side is formed on an end face 33 of the socket 32, and a male screw portion 35 is formed on the outer peripheral face of the columnar portion 34. In addition, a circular hole 36 that is concentric with the rack shaft 16 is formed in the end face of the shaft end portion of the rack shaft 16 so as to extend in the axial direction X, and a female screw portion 37 that corresponds to the male screw portion 35 is formed in the inner peripheral face of the rack shaft 16, which defines the circular hole 36. The male screw portion 35 is screwed into the female screw portion 37, and thus the rack end 22 is fixed to the shaft end portion of the rack shaft 16.

The rack housing 15 has the following portions formed inside each of both ends thereof in the axial direction X: an insertion portion 15a through which the rack shaft 16 is passed; a large-diameter portion 15b of which the inner diameter is larger than that of the insertion portion 15a and into which the socket 32 is inserted; and a restriction face 15c that is orthogonal to the axial direction X and that is located at the boundary between the insertion portion 15a and the large-diameter portion 15b. A second engagement portion 15d, which forms a flange-shaped void, is formed at a restriction face 15c-side end portion of the large-diameter portion 15b so as to extend in the radial direction.

As illustrated in FIG. 2, the outer diameter of the socket 32 is larger than the inner diameter of the insertion portion 15a of the rack housing 15 and is smaller than the inner diameter of the large-diameter portion 15b. The end face 33 of the socket 32 is the end face 33 of the rack end 22. An impact absorbing member 40 is provided between the restriction face 15C of the rack housing 15 and the end face 33 of the rack end 22. The impact absorbing member 40 absorbs an impact that is caused when the rack end 22 collides with (comes into contact with) the rack housing 15. Note that, in the present embodiment, the contact of the rack end 22 with the rack housing 15 means the contact of the rack end 22 with the rack housing 15 via the impact absorbing member 40.

Figure 3:
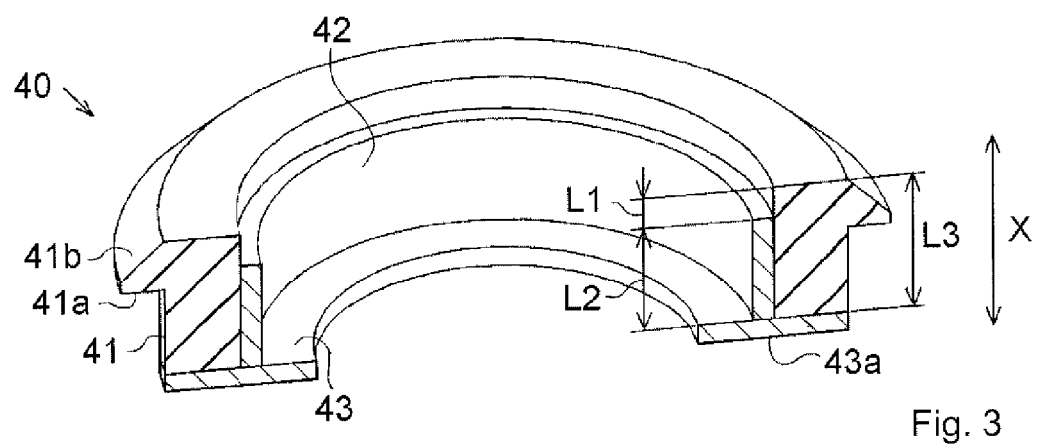
FIG. 3 is a perspective sectional view illustrating an impact absorbing member.

As illustrated in FIG. 2 and FIG. 3, the impact absorbing member 40 according to the present embodiment has: a substantially cylindrical elastic portion 41; a circular tube-shaped restriction portion 42 arranged radially inward of the elastic portion 41; and an annular plate-shaped pressing portion 43 that is in contact with rack end 22-side end faces of the elastic portion 41 and the restriction portion 42. The impact absorbing member 40 is configured in such a manner that the rack shaft 16 is allowed to be passed through the impact absorbing member. The impact absorbing member 40 is arranged inside the rack housing 15 so as to be in contact with the restriction face 15c.

The elastic portion 41 is made of rubber or resin. A flange-shaped first engagement portion 41a is formed at one end (right end in FIG. 2: upper end in FIG. 3) of the elastic portion 41 in the axial direction X. The first engagement portion 41a is fitted to the above-described second engagement portion 15d formed in the rack housing 15, and thus the impact absorbing member 40 is fixed to the rack housing 15. The first engagement portion 41a has an insertion guide portion 41b that is tapered in a direction (rightward in FIG. 2) in which the impact absorbing member 40 is pushed into the rack housing 15.

Specifically, the insertion guide portion 41b has a shape formed by chamfering the first engagement portion 41a such that the surface of the insertion guide portion 41b is slanted at a certain angle (for example, 45 degrees) with respect to the axial direction X in a section obtained by cutting the elastic portion 41 along a plane including the central axis line of the elastic portion 41. The insertion guide portion 41b is provided to reduce sliding resistance between the large-diameter portion 15b and the elastic portion 41 when the impact absorbing member 40 is fitted into the rack housing 15. In a state where the impact absorbing member 40 is fitted to the rack housing 15, the elastic portion 41 is able to absorb and buffer the impact that is caused when the rack end 22 comes into contact with the rack housing 15.

The restriction portion 42 is made of, for example, a metal having an elastic modulus higher (harder) than that of the elastic portion 41, and has an outer diameter that is substantially equal to the inner diameter of the elastic portion 41. The inner diameter of the restriction portion 42 is larger than the inner diameter of the insertion portion 15a of the rack housing 15. Therefore, an end face of the restriction portion 42, which is on the opposite side of the restriction portion 42 from the rack end 22 in the axial direction X, is allowed to come into contact with the restriction face 15c of the rack housing 15 when the contact of the rack end 22 with the rack housing 15 occurs.

Like the restriction portion 42, the pressing portion 43 is made of a metal having an elastic modulus higher than that of the elastic portion 41, and has an outer diameter that is slightly smaller than the inner diameter of the large-diameter portion 15b of the rack housing 15. The inner diameter of the pressing portion 43 is slightly larger than the outer diameter of the shaft end portion of the rack shaft 16, and thus the rack shaft 16 is allowed to be passed through the pressing portion 43. The pressing portion 43 has a pressing surface 43a at one end (left end in FIG. 2) thereof in the axial direction X. The pressing surface 43a comes into contact with the end face 33 of the rack end 22 when the contact of the rack end 22 with the rack housing 15 occurs.

As illustrated in FIG. 3, the impact absorbing member 40 is formed by fixedly adhering the elastic portion 41 and the restriction portion 42 to the pressing portion 43 with their center axis lines coincident with each other. An end face of the elastic portion 41, which is on the opposite side of the elastic portion 41 from the first engagement portion 41a in the axial direction X, is fixedly bonded to the pressing portion 43. In the present embodiment, when the elastic portion 41 made of rubber is vulcanized, the elastic portion 41 and the pressing portion 43 are vulcanized and bonded to each other.

When the elastic portion 41 is compressed and deformed in the axial direction X, the impact absorbing member 40 according to the present embodiment absorbs the impact that is caused when the contact of the rack end 22 with the rack housing 15 occurs. The deformation amount by which the elastic portion 41 is allowed to be deformed, that is, a compression allowance L1, is limited by a length L2 of the restriction portion 42 in the axial direction X. That is, the compression allowance L1 of the elastic portion 41 is determined by a difference between the length L2 of the restriction portion 42 and a length L3 of the elastic portion 41 in the axial direction X, and the elastic portion 41 is restrained from being compressed by an amount that is greater than the length L2 of the restriction portion 42.

The impact absorbing member 40 according to the present embodiment is allowed to be inserted into the large-diameter portion 15b of the rack housing 15 in the axial direction X. Specifically, when the impact absorbing member 40 is inserted into the rack housing 15, the impact absorbing member 40 is inserted through an opening of the large-diameter portion 15b of the rack housing 15. The first engagement portion 41a (insertion guide portion 41b) of the elastic portion 41 is slid on the inner peripheral face of the large-diameter portion 15b of the rack housing 15 while being elastically deformed. When the distal end of the insertion guide portion 41b comes into contact with the restriction face 15c of the rack housing 15, the first engagement portion 41a, which has been elastically deformed, is restored to its original shape in the void formed by the second engagement portion 15d of the rack housing 15, so that the first engagement portion 41a is fitted to the second engagement portion 15d. In this way, the impact absorbing member 40 is fixedly arranged in the rack housing 15.

Figure 4A:
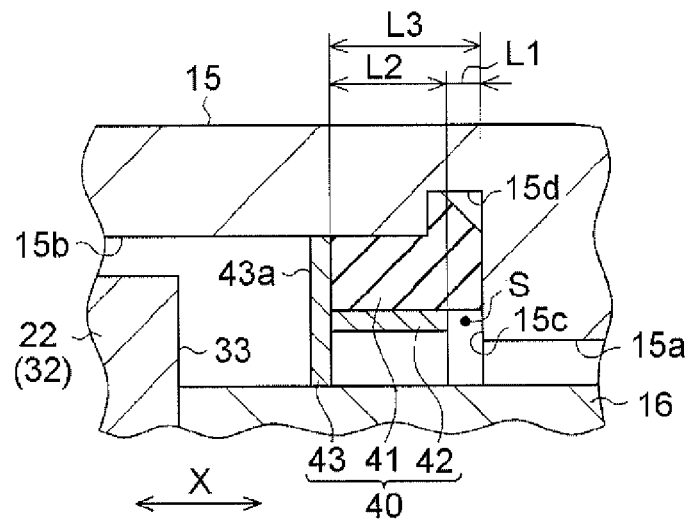
FIG. 4A to FIG. 4C are views schematically illustrating an operation of the steering system when the rack end comes into contact with a rack housing.

Next, an operation of the steering system 10 will be described. As illustrated in FIG. 4A, when the contact of the rack end 22 with the rack housing 15 has not occurred, for example, when the driver has not steered the steering wheel 11 to an allowable limit, the end face 33 of the rack end 22 and the pressing surface 43a of the impact absorbing member 40 are apart from each other.

In this state, when a steering input due to steering or a reverse input from the steered wheel side is input into the rack shaft 16 in such a direction that the contact of the rack end 22 with the rack housing 15 occurs, the rack shaft 16 is moved in such a direction that the end face 33 of the rack end 22 approaches the restriction face 15c of the rack housing 15.

Figure 4B:
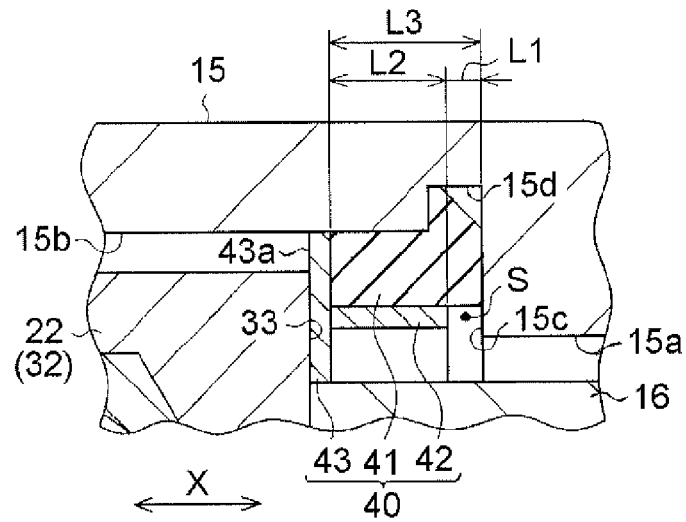

As illustrated in FIG. 4B, when the rack shaft 16 is moved to a position close to the limit of the movable range due to a steering input or a reverse input, the end face 33 of the rack end 22 comes into contact with the pressing surface 43a of the pressing portion 43 of the impact absorbing member 40. That is, the end face 33 of the rack end 22 comes into contact with the restriction face 15c of the rack housing 15 via the elastic portion 41 and pressing portion 43 of the impact absorbing member 40. In this state, a compression load does not act on the impact absorbing member 40. Therefore, the length of the elastic portion 41 of the impact absorbing member 40 is equal to the length L3, and a clearance S is present between the restriction portion 42 and the restriction face 15c of the rack housing 15 in the axial direction X. When the rack shaft 16 is moved from the position illustrated FIG. 4B in such a direction that the end face 33 of the rack end 22 further approaches the restriction face 15c of the rack housing 15, the elastic portion 41 of the impact absorbing member 40 starts to be compressed.

Figure 4C:
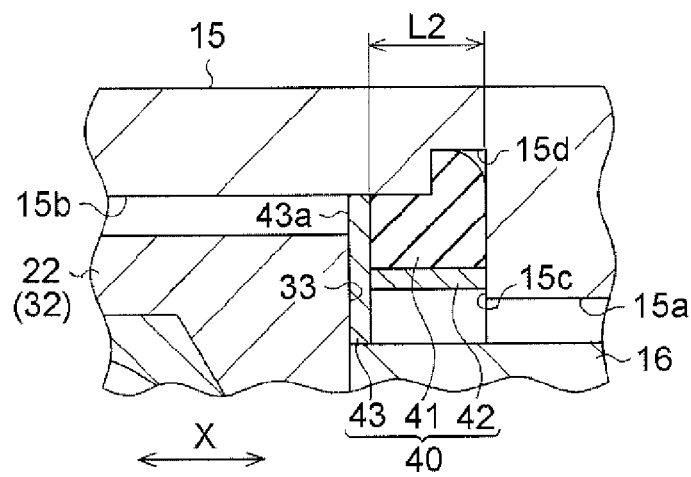

As illustrated in FIG. 4C, when the rack shaft 16 is moved to the limit of the movable range, the end face 33 of the rack end 22 collides with (comes into contact with) the restriction face 15c of the rack housing 15 via the elastic portion 41, restriction portion 42 and pressing portion 43 of the impact absorbing member 40, and the movement of the rack shaft 16 is stopped. The elastic portion 41 of the impact absorbing member 40 is fastened between the end face 33 of the rack end 22 and the restriction face 15c of the rack housing 15, so that the elastic portion 41 is compressed and deformed to the compression limit. Therefore, the length of the elastic portion 41 in the axial direction X becomes equal to the length L2 of the restriction portion 42, and the compression allowance L1 becomes zero. In the state illustrated in FIG. 4C, the elastic portion 41 expands inside the void, which is formed by the second engagement portion 15d, by an amount by which the elastic portion 41 is compressed and deformed in the axial direction X. That is, the volume of the elastic portion 41 made of a rubber, of which the volume is not changed as a whole, is expanded in the radial direction by an amount by which the volume of the elastic portion 41 is compressed in the axial direction X.

When the driver steers the steering wheel 11 in the reverse direction, the end face 33 of the rack end 22 moves apart from the restriction face 15c of the rack housing 15. Therefore, the elastic portion 41 expands in the axial direction X to have the shape illustrated in FIG. 4B, and then returns to the state illustrated in FIG. 4A in which the contact of the rack end 22 with the rack housing 15 does not occur.

Figure 5:
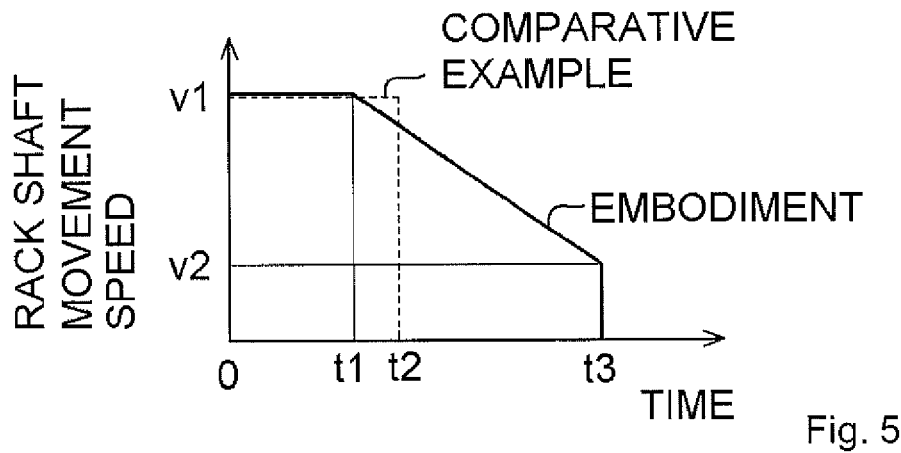
FIG. 5 is a graph illustrating the relationship between time and a movement speed of a rack shaft when the rack end comes into contact with the rack housing.

Next, with reference to FIG. 5, description will be provided on a change in the movement speed of the rack shaft 16 when the contact of the rack end 22 with the rack housing 15 occurs due to a reverse input, on the basis of the operation of the steering system 10. FIG. 5 also illustrates the movement speed of the rack shaft 16 of a steering system without the impact absorbing member 40, as a comparative example that is compared with the steering system 10 according to the present embodiment. Note that the description with reference to FIG. 5 will be provided on the assumption that a reverse input has already been input into the rack shaft 16 and the rack shaft 16 is moved at a speed v1 at time 0.

As illustrated in FIG. 5, the movement speed of the rack shaft 16 in the steering systems according to the embodiment and the comparative example is maintained at the speed V1 until time t1. The rack shaft 16 of the steering system according to the comparative example collides with (comes into contact with) the restriction face 15c of the rack housing 15 at time t2 and the rack shaft 16 is stopped. The movement speed of the rack shaft 16 is changed from the speed v1 to zero within a considerably short time period at time t2.

On the other hand, the rack shaft 16 of the steering system 10 according to the present embodiment comes into contact with the pressing portion 43 of the impact absorbing member 40 at time t1 (refer to FIG. 4B). The speed of the rack shaft 16 is reduced from the speed v1 while the elastic portion 41 of the impact absorbing member 40 is compressed over a time period from time t1 to time t3. This is because the elastic force generated by the compression of the elastic portion 41 acts on the rack shaft 16 as reaction force. The restriction portion 42 of the impact absorbing member 40 collides with the restriction face 15c of the rack housing 15 and the rack shaft 16 is stopped at time t3. That is, in the steering system 10 according to the present embodiment, the movement speed of the rack shaft 16 is changed from the speed v2, which is lower than the speed v1, to zero in a considerably short time period at time t3.

As described above, with regard to an instantaneous speed change (collision acceleration) of the rack shaft 16 according to the embodiment and the comparative example when the contact of the rack end 22 with the rack housing 15 occurs, the speed change of the rack shaft 16 of the steering system 10 according to the embodiment is the speed v2, whereas the speed change of the rack shaft 16 of the steering system according to the comparative example is the speed v1 that is higher than the speed v2. That is, when the contact of the rack end 22 with the rack housing 15 occurs, the collision acceleration of the rack shaft 16 is lower in the present embodiment than in the comparative example. Therefore, when a reverse input acts on the input shaft 16, the rack shaft 16 is decelerated due to the compressive deformation of the elastic portion 41 of the impact absorbing member 40. Therefore, the collision acceleration that acts on the rack shaft 16 and the rack housing 15 is lower than that when the impact absorbing member 40 is not provided in the steering system.

As described above, the elastic portion 41 of the impact absorbing member 40 according to the present embodiment is compressed and deformed over a time period from time t1 to time t3 in FIG. 5. Therefore, if the compression allowance L1 is set to be small, the speed of the rack shaft 16 when the contact of the rack end 22 with the rack housing 15 occurs is higher than the speed v2. On the other hand, if the compression allowance L1 is set to be large, the speed of the rack shaft 16 when the contact of the rack end 22 with the rack housing 15 occurs is lower than the speed v2. Accordingly, if the compression allowance L1 is set to be small, the collision acceleration of the rack shaft 16 when the contact of the rack end 22 with the rack housing 15 occurs becomes large, whereas if the compression allowance L1 is set to be large, the collision acceleration of the rack shaft 16 when the contact of the rack end 22 with the rack housing 15 occurs becomes small. In the present embodiment, based on the relationship between the compression allowance L1 and the collision acceleration, the dimension of the compression allowance L1 is selected in such a manner that the collision acceleration of the rack shaft 16 is lower than or equal to a set acceleration. The set acceleration is set to such an acceleration that, even when the set acceleration acts on the rack shaft 16, the rack housing 15, the steered mechanism 13 and the assist device 14, each of these components is able to operate without problems.

The electric power steering system 10 as in the present embodiment may have the following problems in the case where a collision acceleration when the contact of the rack end 22 with the rack housing 15 occurs is high. That is, a load may be applied to the belt 20 that connects the rack shaft 16 to the motor 19 because the rack shaft 16 is suddenly stopped due to the contact of the rack end 22 with the rack housing 15 but the motor 19 attempts to keep rotating due to inertia. However, in the steering system 10 according to the present embodiment, the provision of the impact absorbing member 40 reduces the impact acceleration and thus the above-described load is reduced.

The change in the speed of the rack shaft 16 over a time period from time t1 to time t3 illustrated in FIG. 5 is influenced by the viscous force of the elastic portion 41 made of rubber, which is proportional to the speed of the rack shaft 16. In actuality, the speed is not linearly changed, but, for convenience of explanation, the speed is illustrated to be linearly changed in FIG. 5.

Figure 6:
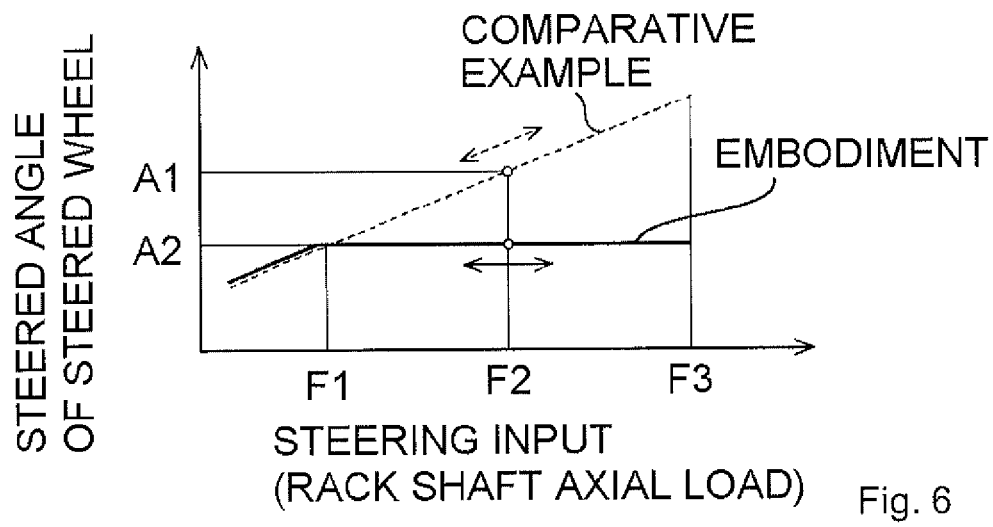
FIG. 6 is a graph illustrating the relationship between a steering input and a steered angle of a steered wheel when the rack end comes into contact with the rack housing.

Next, with reference to FIG. 6, description will be provided on a change in the steered angle of the steered wheel 12 when the rack end 22 comes into contact with the rack housing 15 due to a steering input, on the basis of the operation of the steering system 10. FIG. 6 also illustrates a change in the steered angle in a steering system, in which an impact absorbing member made only of an elastic body such as rubber is arranged on the restriction face 15c of the rack housing 15, as a comparative example that is compared with the steering system 10 according to the present embodiment.

As illustrated in FIG. 6, in the steering systems according to the present embodiment and the comparative example, until a steering input exceeds an input load F1, the steered angle of the steered wheel 12 increases at a constant rate as the steering input is increased. In the steering system 10 according to the present embodiment, the input load F1 is a load by which the rack shaft 16 is moved to the limit of the movable range as illustrated in FIG. 4C.

Because the impact absorbing member is made only of the elastic body in the steering system according to the comparative example, the steering input and the compressive deformation amount of the impact absorbing member have a proportional relationship. In addition, because the rack shaft 16 is already in contact with the impact absorbing member, the compressive deformation amount of the impact absorbing member and the movement distance of the rack shaft 16 also have a proportional relationship. Therefore, a proportional relationship between the steering input and the steered angle of the steered wheel 12 is expressed by a dashed line in FIG. 6. Therefore, for example, when the steering input is deviated from an input load F2 even if only slightly, a steered angle A1 with respect to the input load F2 is changed as illustrated by a dashed line with arrows. Therefore, the driver is required to maintain a constant steering input to keep the steered angle of the steered wheel 12 at a constant steered angle. As a result, the drivability may be deteriorated.

In addition, even if the driver is able to maintain a constant steering input, when a reverse input that acts on the rack shaft 16 via the steered wheel 12 changes due to a change in the conditions of the road surface that contacts the steered wheels 12, the steered angle of the steered wheel 12 is changed. As a result, it is not possible to keep the steered angle at a constant steered angle. Therefore, in the steering system according to the comparative example, there is still a possibility that the drivability may be deteriorated. Furthermore, the driver is likely to feel a sense of discomfort due to elasticity which is caused by the deformation of the impact absorbing member made of only an elastic body when the contact of the rack end 22 with the rack housing 15 occurs.

In contrast, in the steering system 10 according to the present embodiment, when the steering input reaches the input load F1, the elastic portion 41 of the impact absorbing member 40 is compressed to the limit and the rack shaft 16 is moved to the limit of the movable range (refer to FIG. 4C). Accordingly, even if a steering input is equal to or higher than the input load F1, the movement of the rack shaft 16 is restricted and thus the steered angle of the steered wheel 12 is maintained at a steered angle. A2 that corresponds to the input load F1. For example, even when the steering input is offset from the input load F2, the steered angle A2 with respect to the input load F2 is not changed as illustrated by a solid line with arrows. Therefore, if the driver steers the steering wheel 11 in such a manner that the steering input becomes larger than the input load F1, the steered angle A2 of the steered wheel 12 is easily maintained at a constant angle.

Similarly, even if a reverse input that acts on the rack shaft 16 via the steered wheel 12 changes, for example, due to a change in the conditions of the road surface that contacts the steered wheels 12, a change in the steered angle of the steered wheel 12 is suppressed. In addition, in the steering system 10 according to the present embodiment, because the rack shaft 16 and the rack housing 15 come into contact with each other via the restriction portion 42 when the contact of the rack end 22 with the rack housing 15 occurs, the driver is less likely to feel a sense of discomfort due to elasticity.

In addition, as illustrated in FIG. 6, the compression load required to bring the compression allowance L1 to zero, that is, the input load F1, is equal to or lower than half of a maximum axial load F, which is the maximum value of the axial load that acts on the rack end 22 due to a steering input. The maximum axial load F3 is the maximum value of the axial load that is generated in the rack shaft 16 of the vehicle due to a steering input that is generated by a driver's steering operation and the assist device 14. Because the input load F1 is lower than the maximum axial load F3, a time period, during which the driver feels elasticity when the driver steers the steering wheel 11, is shortened.

According to the present embodiment, the following advantageous effects are obtained.

(1) The rack end 22 and the rack housing 15 come into contact with (collide with) each other. In other words, the contact of the rack end 22 with the rack housing 15 means the contact of the rack end 22 with the rack housing 15 via the impact absorbing member 40 provided between the rack end 22 and the rack housing 15. First, when the contact of the rack end 22 with the rack housing 15 occurs due to a reverse input that is input into the rack end 22 via the steered wheel 12, the impact absorbing member 40 provided between the rack end 22 and the rack housing 15 absorbs the impact. Therefore, the impact that acts on the steering system is lower than that when the impact absorbing member 40 is not provided. In the meantime, when the contact of the rack end 22 with the rack housing 15 occurs due to a steering input, the compression allowance L1 is completely eliminated, that is, the compression allowance L1 becomes zero. Therefore, the end face 33 of the rack end 22 and the restriction face 15c of the rack housing 15 come into contact with each other via at least the restriction portion 42. Therefore, the driver of the vehicle is less likely to feel a sense of discomfort due to elasticity caused by the compressive deformation of the elastic portion 41 when the contact of the rack end 22 with the rack housing 15 occurs while a steering input is generated, as compared with the case where the restriction portion 42 is not provided. As a result, deterioration of the drivability is suppressed. Accordingly, it is possible to absorb an impact load, which is generated when the contact of the rack end 22 with the rack housing 15 occurs, and to suppress deterioration of the drivability.

(2) Usually, when the contact of the rack end 22 with the rack housing 15 occurs due to a reverse input that is larger than a steering input, the speed of the rack shaft 16 suddenly becomes zero and thus a high collision acceleration acts on the rack shaft 16. In the steering system 10 according to the present embodiment, because the length of the compression allowance L1 is set in such a manner that the collision acceleration is equal to or lower than the set acceleration that is set in advance, the collision acceleration that acts on the rack shaft 16 is kept low.

(3) As compared with the case where the compression load required to bring the compression allowance L1 of the elastic portion 41 to zero is larger than, for example, a half of the maximum axial load F3, the contact between the rack end 22 and the rack housing 15 via the restriction portion 42 occurs at an earlier time when the driver steers the steering wheel 1 to the allowable steering angle. In other words, the rack end 22 is brought into contact with the rack housing 15 via the restriction portion 42 by a smaller steering input. Accordingly, it is possible to shorten a time period during which the driver feels elasticity when the driver steers the steering wheel 11 to the allowable steering angle.

(4) The first engagement portion 41a of the elastic portion 41 is elastically deformed and fitted to the second engagement portion of the rack housing 15. Thus, the impact absorbing member 40 is fixed at a position between the end face 33 of the rack end 22 and the restriction face 15c of the rack housing 15. That is, it is not necessary to provide a fixation member that is used to fix the impact absorbing member 40 to the rack housing 15.

(5) The insertion guide portion 41b that is tapered in a direction in which the impact absorbing member 40 is inserted into the rack housing 15 is provided. Thus, a resistance that is generated when the impact absorbing member 40 is inserted into the rack housing 15 is reduced. Therefore, the impact absorbing member 40 is easily attached to the rack housing 15.

The following modifications may be made to the above-described embodiment.

Figure 7:
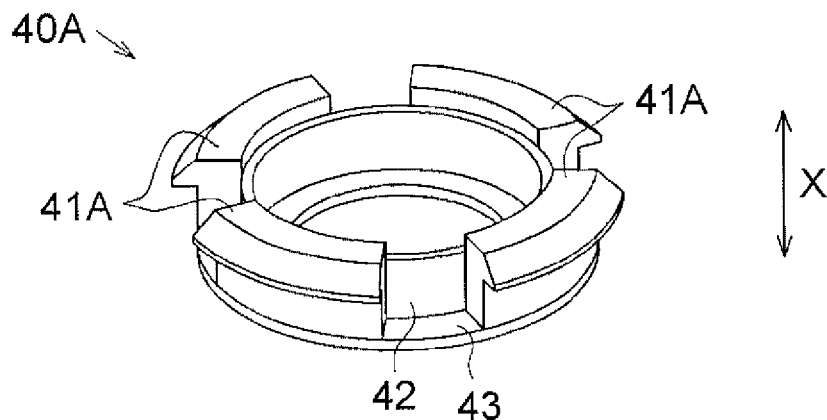
FIG. 7 is a perspective view illustrating an impact absorbing member in a modified example.

In the above-described embodiment, the elastic portion 41 of the impact absorbing member 40 may be modified as illustrated in FIG. 7. That is, a plurality of elastic portions 41A may be provided at predetermined intervals in the circumferential direction orthogonal to the radial direction of an impact absorbing member 40A. With this configuration, when the elastic portions 41A are compressed and deformed in the axial direction X, the elastic portions 41A are allowed to expand and deform in the circumferential direction. Therefore, the compression allowance L1 may be set to a large value.

In the above-described embodiment, the elastic portion 41 may be formed of, for example, an elastic member without viscosity, such as a coil spring.

In the above-described embodiment, the steering system 10 may be a hydraulic power steering system, or may be a steering system without a power steering mechanism.

In the above-described embodiment, the first engagement portion 41a and the second engagement portion 15d need not be provided. In this case, the elastic portion 41 is preferably bonded to the restriction face 15c of the rack housing 15. Furthermore, in this case, the elastic portions 41A are preferably allowed to expand and deform in the circumferential direction when the elastic portions 41A are compressed and deformed in the axial direction X, like the impact absorbing member 40A in FIG. 7.

In the above-described embodiment, the pressing portion 43 of the impact absorbing member 40 may be omitted. In addition, the pressing portion 43 and the restriction portion 42 may be formed as a single-piece member.

In the above-described embodiment, the positional relationship between the elastic portion 41 and the restriction portion 42 of the impact absorbing member 40 may be changed such that the elastic portion 41 is arranged radially inward of the restriction portion 42.

In the above-described embodiment, the impact absorbing member 40 may be fixed to the end face 33 of the rack end 22. Alternatively, the impact absorbing member 40 may be fixed to neither the restriction face 15c of the rack housing 15 nor the end face 33 of the rack end 22, and the impact absorbing member 40 may be fitted onto the rack shaft 16 loosely enough to be allowed to slide with respect to the rack shaft 16.

In the above-described embodiment, the compression load required to bring the compression allowance L1 to zero may be larger than the half of the maximum axial load F3 as long as it is smaller than the maximum axial load F3.

In the above-described embodiment, the first engagement portion 41a and the second engagement portion 15d may be formed such that the first engagement portion 41a and the second engagement portion 15d are engaged with each other at the restriction face 15c of the rack housing 15. In addition, the first engagement portion 41a may be formed as a recessed portion, and the second engagement portion 15d may be formed as a projected portion.

In the above-described embodiment, the insertion guide portion 41b need not be provided.

What is claimed is:

1. A steering system comprising:
   a steered shaft that is able to reciprocate in an axial direction of the steered shaft;
   a housing that accommodates the steered shaft;
   a joint that is fitted to a shaft end portion of the steered shaft so as to connect the steered shaft to a steered wheel such that the steered wheel is allowed to be steered; and
   an impact absorbing member that is provided between a restriction face formed within the housing and an end face of the joint, and that absorbs an impact generated when the restriction face and the end face come into contact with each other,
   wherein the impact absorbing member includes an elastic portion having elasticity, and a restriction portion having an elastic modulus higher than that of the elastic portion and having a length in the axial direction, which is shorter than that of the elastic portion, and
   wherein a compression allowance, which is a difference in length in the axial direction between the elastic portion and the restriction portion, is brought to zero when the restriction face and the end face come into contact with each other via the impact absorbing member due to a steering input.

2. The steering system according to claim 1, wherein the compression allowance is set such that a collision acceleration, which acts on the steered shaft when the restriction face and the end face come into contact with each other via the restriction portion due to a reverse input that is input into the joint via the steered wheel, is equal to or lower than a set acceleration.

3. The steering system according to claim 1, wherein a compression load required to bring the compression allowance to zero is equal to or lower than a half of a maximum axial load that is a maximum value of axial load that acts on the joint due to the steering input.

4. The steering system according to claim 1, wherein the impact absorbing member is fixed to the housing when a first engagement portion formed in the elastic portion and a second engagement portion formed within the housing so as to be engageable with the first engagement portion, one of the first engagement portion and the second engagement portion being a projected portion and the other one of the first engagement portion and the second engagement portion being a recessed portion, are engaged with each other.

5. The steering system according to claim 4, wherein:
   the impact absorbing member is fixed to the housing by being inserted into the housing in the axial direction; and
   the first engagement portion has an insertion guide portion that is tapered in a direction in which the impact absorbing member is inserted into the housing.

* * * * *